US008301590B2

(12) United States Patent
Kasten et al.

(10) Patent No.: US 8,301,590 B2
(45) Date of Patent: Oct. 30, 2012

(54) CUSTOM CACHING

(75) Inventors: Christopher J. Kasten, Sacramento, CA (US); Greg Seitz, Lake Oswego, OR (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/026,909

(22) Filed: Feb. 14, 2011

(65) Prior Publication Data

US 2011/0137914 A1    Jun. 9, 2011

Related U.S. Application Data

(63) Continuation of application No. 11/965,458, filed on Dec. 27, 2007, now Pat. No. 7,890,537, which is a continuation of application No. 11/007,061, filed on Dec. 8, 2004, now Pat. No. 7,406,464.

(60) Provisional application No. 60/528,237, filed on Dec. 8, 2003, provisional application No. 60/528,238, filed on Dec. 8, 2003, provisional application No. 60/528,053, filed on Dec. 8, 2003.

(51) Int. Cl.
    *G06F 17/30* (2006.01)
(52) U.S. Cl. ........................................ 707/610
(58) Field of Classification Search ............... 709/235; 711/133, 141; 726/26; 707/610
    See application file for complete search history.

(56) References Cited

U.S. PATENT DOCUMENTS

| 5,226,146 A | 7/1993 | Milia et al. |
| 5,590,366 A * | 12/1996 | Bryant et al. ............... 709/235 |
| 5,734,887 A | 3/1998 | Kingberg et al. |
| 5,778,178 A | 7/1998 | Arunachalam |
| 5,909,570 A | 6/1999 | Webber |
| 5,937,402 A | 8/1999 | Pandit |
| 5,953,716 A | 9/1999 | Madnick et al. |
| 5,970,490 A | 10/1999 | Morgenstern |
| 5,978,581 A | 11/1999 | Sadiq et al. |
| 5,987,500 A | 11/1999 | Arunachalam |
| 6,047,295 A | 4/2000 | Endicott et al. |
| 6,134,559 A | 10/2000 | Brumme et al. |
| 6,167,402 A * | 12/2000 | Yeager ............................ 1/1 |

(Continued)

FOREIGN PATENT DOCUMENTS

WO    WO-9932996 A1    7/1999

(Continued)

OTHER PUBLICATIONS

"U.S. Appl. No. 11/007,061, Notice of Allowance mailed Mar. 17, 2008", 9 pgs.

(Continued)

*Primary Examiner* — Etienne Leroux
(74) *Attorney, Agent, or Firm* — Schwegman Lundberg & Woessner, P.A.

(57) ABSTRACT

Methods and systems are presented for custom caching. Application threads define caches. The caches may be accessed through multiple index keys, which are mapped to multiple application thread-defined keys. Methods provide for the each index key and each application thread-defined key to be symmetrical. The index keys are used for loading data from one or more data sources into the cache stores on behalf of the application threads. Application threads access the data from the cache store by providing references to the caches and the application-supplied keys. Some data associated with some caches may be shared from the cache store by multiple application threads. Additionally, some caches are exclusively accessed by specific application threads.

2 Claims, 8 Drawing Sheets

U.S. PATENT DOCUMENTS

| | | | |
|---|---|---|---|
| 6,212,556 B1 | 4/2001 | Arunachalam | |
| 6,279,008 B1 | 8/2001 | Tung Ng et al. | |
| 6,289,358 B1 | 9/2001 | Mattis et al. | |
| 6,427,195 B1 | 7/2002 | McGowen et al. | |
| 6,457,003 B1 | 9/2002 | Gajda et al. | |
| 6,476,833 B1 | 11/2002 | Moshfeghi | |
| 6,594,669 B2 | 7/2003 | Asami et al. | |
| 6,611,838 B1 | 8/2003 | Ignat et al. | |
| 6,694,321 B1 | 2/2004 | Berno | |
| 6,701,381 B2 | 3/2004 | Hearne | |
| 6,728,840 B1 | 4/2004 | Shatil et al. | |
| 6,741,997 B1 | 5/2004 | Liu | |
| 6,748,374 B1 | 6/2004 | Madan et al. | |
| 6,789,170 B1 | 9/2004 | Jacobs et al. | |
| 6,825,848 B1 | 11/2004 | Fu et al. | |
| 6,850,950 B1 | 2/2005 | Clarke et al. | |
| 7,020,660 B2 | 3/2006 | Woodring | |
| 7,039,764 B1* | 5/2006 | Shetty et al. | 711/133 |
| 7,096,229 B2 | 8/2006 | Dettinger et al. | |
| 7,167,874 B2 | 1/2007 | Shalabi et al. | |
| 7,171,692 B1* | 1/2007 | DeMello et al. | 726/26 |
| 7,350,192 B2 | 3/2008 | Seitz et al. | |
| 7,406,464 B2 | 7/2008 | Kasten et al. | |
| 7,725,460 B2 | 5/2010 | Seitz et al. | |
| 7,779,386 B2 | 8/2010 | Seitz et al. | |
| 7,890,537 B2 | 2/2011 | Kasten et al. | |
| 7,904,487 B2 | 3/2011 | Ghatare | |
| 8,046,376 B2 | 10/2011 | Seitz | |
| 8,176,040 B2 | 5/2012 | Seitz et al. | |
| 8,200,684 B2 | 6/2012 | Seitz et al. | |
| 2002/0091702 A1 | 7/2002 | Mullins | |
| 2002/0184612 A1 | 12/2002 | Hunt et al. | |
| 2003/0005342 A1* | 1/2003 | Thomas et al. | 713/400 |
| 2003/0037076 A1 | 2/2003 | Bravery et al. | |
| 2003/0050863 A1 | 3/2003 | Radwin | |
| 2003/0069880 A1 | 4/2003 | Harrison et al. | |
| 2003/0187991 A1 | 10/2003 | Lin et al. | |
| 2004/0088493 A1* | 5/2004 | Glasco | 711/141 |
| 2004/0193620 A1 | 9/2004 | Cheng et al. | |
| 2004/0210556 A1 | 10/2004 | Brooke et al. | |
| 2004/0254939 A1 | 12/2004 | Dettinger et al. | |
| 2005/0149907 A1 | 7/2005 | Seitz et al. | |
| 2005/0154722 A1 | 7/2005 | Seitz et al. | |
| 2005/0154765 A1 | 7/2005 | Seitz et al. | |
| 2005/0165758 A1 | 7/2005 | Kasten et al. | |
| 2005/0182758 A1 | 8/2005 | Seitz et al. | |
| 2006/0101385 A1 | 5/2006 | Gerken et al. | |
| 2008/0059950 A1 | 3/2008 | Seitz et al. | |
| 2008/0162820 A1 | 7/2008 | Kasten et al. | |
| 2010/0095270 A1 | 4/2010 | Seitz et al. | |
| 2010/0268749 A1 | 10/2010 | Seitz et al. | |
| 2011/0087645 A1 | 4/2011 | Seitz et al. | |

FOREIGN PATENT DOCUMENTS

| | | |
|---|---|---|
| WO | WO-9933006 A1 | 7/1999 |
| WO | WO-2005010650 A2 | 2/2005 |
| WO | WO-2005057364 A2 | 6/2005 |
| WO | WO-2005057364 A3 | 6/2005 |
| WO | WO-2005057365 A2 | 6/2005 |
| WO | WO-2005057365 A3 | 6/2005 |

OTHER PUBLICATIONS

"U.S. Appl. No. 11/007,061, Response filed Nov. 21, 2007 to Non-Final Office Action mailed Aug. 23, 2007", 7 pgs.

"U.S. Appl. No. 11/007,061, Supplemental Notice of Allowability mailed May 2, 2008", 5 pgs.

"U.S. Appl. No. 11/009,388, Advisory Action mailed Apr. 6, 2006", 3 pgs.

"U.S. Appl. No. 11/009,388, Advisory Action mailed May 14, 2007", 3 pgs.

"U.S. Appl. No. 11/009,388, Examiner Interview Summary mailed Jul. 6, 2007", 1 pg.

"U.S. Appl. No. 11/009,388, Final Office Action mailed Jan. 13, 2006", 10 pgs.

"U.S. Appl. No. 11/009,388, Final Office Action mailed Jan. 25, 2007", 10 pgs.

"U.S. Appl. No. 11/009,388, Non Final Office Action mailed Jun. 24, 2005", 10 pgs.

"U.S. Appl. No. 11/009,388, Non Final Office Action mailed Jul. 25, 2006", 16 pgs.

"U.S. Appl. No. 11/009,388, Notice of Allowance mailed Jul. 16, 2007", 9 pgs.

"U.S. Appl. No. 11/009,388, Notice of Allowance mailed Nov. 16, 2007", 4 pgs.

"U.S. Appl. No. 11/009,388, Pre-Appeal Brief Request filed May 25, 2007", 5 pgs.

"U.S. Appl. No. 11/009,388, Response filed Mar. 13, 2006 to Final Office Action mailed Jan. 13, 2006", 12 pgs.

"U.S. Appl. No. 11/009,388, Response filed Mar. 26, 2007 to Final Office Action mailed Jan. 25, 2007", 14 pgs.

"U.S. Appl. No. 11/009,388, Response filed Oct. 24, 2005 to Non Final Office Action mailed Jun. 24, 2005", 11 pgs.

"U.S. Appl. No. 11/009,388, Response filed Oct. 25, 2006 to Non Final Office Action mailed Jul. 25, 2006", 15 pgs.

"U.S. Appl. No. 11/009,411, Advisory Action mailed May 9, 2008", 3 pgs.

"U.S. Appl. No. 11/009,411, Final Office Action mailed Feb. 21, 2008", 14 pgs.

"U.S. Appl. No. 11/009,411, Non Final Office Action mailed Feb. 23, 2007", 9 pgs.

"U.S. Appl. No. 11/009,411, Non Final Office Action mailed Aug. 24, 2007", 13 pgs.

"U.S. Appl. No. 11/009,411, Non-Final Office Action mailed Sep. 5, 2008", 12 pgs.

"U.S. Appl. No. 11/009,411, Non-Final Office Action mailed Dec. 24, 2008", 5 pgs.

"U.S. Appl. No. 11/009,411, Notice of Allowance mailed Jan. 12, 2010", 11 pgs.

"U.S. Appl. No. 11/009,411, Pre-Appeal Brief Request filed May 21, 2008", 5 pgs.

"U.S. Appl. No. 11/009,411, Response filed Mar. 24, 2009 to Non Final Office Action mailed Dec. 24, 2008", 8 pgs.

"U.S. Appl. No. 11/009,411, Response filed Apr. 21, 2008 to Final Office Action mailed Feb. 21, 2008", 14 pgs.

"U.S. Appl. No. 11/009,411, Response filed May 23, 2007 to Non Final Office Action mailed Feb. 23, 2007", 9 pgs.

"U.S. Appl. No. 11/009,411, Response filed Nov. 26, 2007 to Non-Final Office Action mailed Aug. 24, 2007", 13 pgs.

"U.S. Appl. No. 11/009,411, Response filed Dec. 5, 2008 to Non-Final Office Action mailed Sep. 5, 2008", 13 pgs.

"U.S. Appl. No. 12/783,452, Response filed Nov. 17, 2010 to Non Final Office Action mailed Aug. 17, 2010", 13 pgs.

Cohn, M., et al., "JAVA Developer's Reference", Sams.net Publishing, (1996), 1, 2, 80, 81.

Santucci, et al., "A hypertabular visualizer of query results", IEEE, 189-196., Sep. 1997), 23-26.

Wooguil, P, et al., "Flexible and fast IP lookup algorithm", IEEE, vol. 7, 2053-2057., (Jun. 2001), 11-14.

"U.S. Appl. No. 11/007,061, Non Final Office Action mailed Aug. 23, 2007", 13 pgs.

"U.S. Appl. No. 11/008,775, Advisory Action mailed Jan. 28, 2010", 3 pgs.

"U.S. Appl. No. 11/008,776, Advisory Action mailed Mar. 5, 2008", 3 pgs.

"U.S. Appl. No. 11/008,776, Final Office Action mailed Nov. 2, 2007", 11 pgs.

"U.S. Appl. No. 11/008,776, Final Office Action mailed Nov. 13, 2009", 13 pgs.

"U.S. Appl. No. 11/008,776, Final Office Action mailed Nov. 24, 2008", 15 pgs.

"U.S. Appl. No. 11/008,776, Non Final Office Action mailed May 14, 2007", 13 pgs.

"U.S. Appl. No. 11/008,776, Non Final Office Action mailed Jun. 29, 2011", 13 pgs.

"U.S. Appl. No. 11/008,776, Non-Final Office Action mailed Apr. 8, 2009", 15 pgs.

"U.S. Appl. No. 11/008,776, Non-Final Office Action mailed Jun. 2, 2008", 12 pgs.

"U.S. Appl. No. 11/008,776, Notice of Allowance mailed Feb. 14, 2012", 13 pgs.
"U.S. Appl. No. 11/008,776, Response filed Jan. 12, 2010 to Final Office Action mailed Nov. 13, 2009", 11 pgs.
"U.S. Appl. No. 11/008,776, Response filed Jan. 26, 2009 to Final Office Action mailed Nov. 24, 2008", 12 pgs.
"U.S. Appl. No. 11/008,776, Response filed Feb. 4, 2008 to Final Office Action mailed Nov. 2, 2007", 14 pgs.
"U.S. Appl. No. 11/008,776, Response filed Jul. 8, 2009 to Non Final Office Action mailed Apr. 8, 2009", 12 pgs.
"U.S. Appl. No. 11/008,776, Response filed Aug. 14, 2007 to Non Final Office Action mailed May 14, 2007", 16 pgs.
"U.S. Appl. No. 11/008,776, Response filed Sep. 2, 2008 to Non-Final Office Action mailed Jun. 2, 2008", 11 pgs.
"U.S. Appl. No. 11/008,776, Response filed Nov. 29, 2011 to Non-Final Office Action mailed Sep. 29, 2011", 12 pgs.
"U.S. Appl. No. 11/009,412, Advisory Action mailed Apr. 6, 2006", 3 pgs.
"U.S. Appl. No. 11/009,412, Advisory Action mailed Apr. 17, 2007", 3 pgs.
"U.S. Appl. No. 11/009,412, Final Office Action mailed Jan. 13, 2006", 10 pgs.
"U.S. Appl. No. 11/009,412, Final Office Action mailed Jan. 25, 2007", 17 pgs.
"U.S. Appl. No. 11/009,412, Final Office Action mailed Nov. 26, 2008", 10 pgs.
"U.S. Appl. No. 11/009,412, Final Office Action mailed Dec. 3, 2007", 9 pgs.
"U.S. Appl. No. 11/009,412, Non-Final Office Action mailed May 14, 2008", 9 pgs.
"U.S. Appl. No. 11/009,412, Non-Final Office Action mailed Jun. 20, 2007", 11 pgs.
"U.S. Appl. No. 11/009,412, Non-Final Office Action mailed Jun. 24, 2005", 10 pgs.
"U.S. Appl. No. 11/009,412, Non-Final Office Action mailed Jul. 27, 2006", 15 pgs.
"U.S. Appl. No. 11/009,412, Notice of Allowance mailed May 4, 2010", 12 pgs.
"U.S. Appl. No. 11/009,412, Notice of Allowance mailed Sep. 21, 2009", 12 pgs.
"U.S. Appl. No. 11/009,412, Response filed Feb. 4, 2008 to Final Office Action mailed Dec. 3, 2007", 14 pgs.
"U.S. Appl. No. 11/009,412, Response filed Feb. 26, 2009 to Final Office Action mailed Nov. 26, 2008", 30 pgs.
"U.S. Appl. No. 11/009,412, Response filed Mar. 13, 2006 to Final Office Action mailed Jan. 13, 2006", 11 pgs.
"U.S. Appl. No. 11/009,412, Response filed Mar. 26, 2007 to Final Office Action mailed Jan. 25, 2007", 17 pgs.
"U.S. Appl. No. 11/009,412, Response filed Jul. 24, 2007 to Advisory Action mailed Apr. 17, 2007", 17 pgs.
"U.S. Appl. No. 11/009,412, Response filed Aug. 14, 2008 to Non Final Office Action mailed May 14, 2008", 13 pgs.
"U.S. Appl. No. 11/009,412, Response filed Sep. 20, 2007 to Non-Final Office Action mailed Jun. 20, 2007", 13 pgs.
"U.S. Appl. No. 11/009,412, Response filed Oct. 24, 2005 to Non-Final Office Action mailed Jun. 24, 2005", 12 pgs.
"U.S. Appl. No. 11/009,412, Response filed Oct. 27, 2006 to Non-Final Office Action mailed Jul. 27, 2006", 15 pgs.
"U.S. Appl. No. 11/088,776, Final Office Action mailed Nov. 13, 2009", 15 pgs.
"U.S. Appl. No. 11/965,458 Notice of Allowance mailed Oct. 6, 2010", 6 pgs.
"U.S. Appl. No. 11/965,458, Non-Final Office Action mailed Mar. 23, 2010", 11 pgs.
"U.S. Appl. No. 11/965,458, Notice of Allowance mailed Jul. 22, 2010", 6 pgs.
"U.S. Appl. No. 11/965,458, Notice of Allowance mailed Oct. 6, 2010", 6 pgs.
"U.S. Appl. No. 11/965,458, Response filed Jun. 23, 2010 to Non Final Office Action mailed Mar. 23, 2010", 8 pgs.
"U.S. Appl. No. 11/975,886, Final Office Action mailed Dec. 8, 2011", 14 pgs.
"U.S. Appl. No. 11/975,886, Non Final Office Action mailed Mar. 29, 2012", 16 pgs.
"U.S. Appl. No. 11/975,886, Non Final Office Action mailed Jul. 22, 2011", 15 pgs.
"U.S. Appl. No. 11/975,886, Response filed Feb. 8, 2012 to Final Office Action mailed Dec. 8, 2011", 18 pgs.
"U.S. Appl. No. 11/975,886, Response filed May 29, 2012 to Non-Final Office Action mailed Mar. 29, 2012", 19 pgs.
"U.S. Appl. No. 11/975,886, Response filed Oct. 24, 2011 to Non-Final Office Action mailed Jul. 22, 2011", 15 pgs.
"U.S. Appl. No. 12/638,913, Notice of Allowance mailed May 21, 2012", 15 pgs.
"U.S. Appl. No. 12/783,452, Non-Final Office Action mailed Aug. 17, 2010", 13 pgs.
"U.S. Appl. No. 12/783,452, Notice of Allowance mailed Feb. 17, 2011", 12 pgs.
"U.S. Appl. No. 12/783,452, Notice of Allowance mailed Jun. 1, 2011", 12 pgs.
"U.S. Appl. No. 12/901,275, 312 Amendment filed Feb. 23, 2012", 57 pgs.
"U.S. Appl. No. 12/901,275, Final Office Action mailed Sep. 15, 2011", 13 pgs.
"U.S. Appl. No. 12/901,275, Non Final Office Action mailed Apr. 1, 2011", 12 pgs.
"U.S. Appl. No. 12/901,275, Notice of Allowance mailed Dec. 22, 2011", 11 pgs.
"U.S. Appl. No. 12/901,275, Preliminary Amendment filed Oct. 8, 2010", 10 pgs.
"U.S. Appl. No. 12/901,275, Response filed Jul. 1, 2011 to Non Final Office Action mailed Apr. 1, 2011", 17 pgs.
"U.S. Appl. No. 12/901,275, Response filed Dec. 8, 2011 to Final Office Action mailed Sep. 15, 2011", 9 pgs.
"U.S. Appl. No. 12/901,275, Response to Rule 312 Communication mailed Mar. 15, 2012", 2 pgs.
"U.S. Appl. No. 12/901,275, Response to Rule 312 Communication mailed Apr. 4, 2012", 2 pgs.
"International Application Serial No. PCT/US2004/041071, International Preliminary Report on Patentability mailed Jun. 22, 2006", 5 pgs.
"International Application Serial No. PCT/US2004/041071, International Search Report mailed Mar. 23, 2006", 2 pgs.
"International Application Serial No. PCT/US2004/041071, Written Opinion mailed Mar. 23, 2006", 4 pgs.
Aquino, Mario, "A Simple Data Access Layer using Hibernate", Object Computing, Inc., http://www.ociweb.com/jnb/jnbNov2003.html, (Nov. 19, 2003), 13 pgs.
Bourret, R., et al., "A generic load/extract utility for data transfer between XML documents and relational databases", Second International Workshop on Advanced Issues of E-Commerce and Web-Based Information Systems, 2000. WECWIS 2000, IEEE, (2000), 134-143.
Calmet, Jacques, et al., "A generic Query-translation framework for a mediator architecture", IEEE, (Apr. 1997), 434-443.
Cheng, et al., "XML and DB2", IEEE, (Aug. 6, 2002), 5 pgs.
Cheng, J., et al., "XML and DB2", 16th International Conference on Data Engineering (ICDE'00), IBM Santa Teresa Laboratory, (2000), 5 pgs.

* cited by examiner

USER_TABLE — 742

MARKETPLACE number(38)
ID number(38)
USERID varchar2(64) (unique)
USER_STATE number(38)
PASSWORD varchar2(64) (encrypted)
SALT varchar2(64) (encrypt key for passwd)
LAST_MODIFIED date
USERID_LAST_CHANCE date
FLAGS number(38)
EMAIL varchar2(64) (unique)
COUNTRY_ID number(10)
UVDETAIL number(16)
UVRATING number(5)
SCORE number(38)
SITE_ID number(4)
CO_PARTNERID number(4)
BILLING_CURRENCY_ID number(3)

*FIG. 9*

LISTINGS TABLE — 744

ID
DESCRIPTION
CATEGORY_ID
PRICE
CLOSE_DATE
RESERVE_PRICE
SELLER_ID
LIST_DATE
REMINDER_SENT

*FIG. 8*

CUSTOM CACHING

RELATED APPLICATIONS

This application is with, claims the benefit of, and is a Continuation of U.S. patent application Ser. No. 11/965,458, filed on Dec. 27, 2007 and titled "Custom Caching" and which is set to issue as U.S. Pat. No. 7,890,537 on Feb. 15, 2011; application Ser. No. 11/965,458 is a continuation of and claims the benefit of application Ser. No. 11/007,061, filed on Dec. 8, 2004, and titled "Custom Caching" which is now issued as U.S. Pat. No. 7,406,464 on Jul. 29, 2008 and which claims the benefit of U.S. Provisional Application No. 60/528,053 filed on Dec. 8, 2003; U.S. Provisional Application No. 60/528,237 filed on Dec. 8, 2003; and U.S. Provisional Application No. 60/528,238 filed on Dec. 8, 2003; the disclosures of all of these applications are incorporated by reference herein.

FIELD

The invention relates generally to data management and more particularly to cache customization.

Background

Technological advancements have led to more sophisticated and powerful data management systems. Data processing in such systems require efficient handling a large number of data transactions (e.g. data reads, writes, etc.).

The advent of the Internet and the World-Wide Web (WWW) combined with the development of network-based commerce system applications have enabled companies to transact business globally real-time. Such network-based commerce systems may process large amounts of data transactions from geographically dispersed users. The users may enter transactional requests over communications lines that result in the persistent storage of data in a master information source (data store). In several cases, back-end systems (e.g., database servers, etc.) support the data store and interact with other systems or services to map the data between a persistent or relational form into an object form that is more readily utilized by software applications.

Furthermore, software developers typically expend a large amount of time and energy in managing access related to the data store and in managing memory usage within their applications, which is used to manipulate data acquired from the data store within the scope of their applications. One tool that developers rely on for improving processing throughput of their applications is a cache manager or cache service. However, cache services are typically not customizable and are not extensible by the developers within their applications. This is so, because caching services are generally implemented as black boxes having a defined set of generalized and static services or features. As a result, data store access and memory management are tasks that developers still largely have to account for within their individual applications. These tasks are time consuming and in some cases not optimal because some developers may not be as adept as other developers in handling these tasks.

SUMMARY

In various embodiments, extensible caching services and techniques are presented. An application's access to a data store is transparent to the application. An application can customize, extend, and instantiate its own caching environment. The caching techniques or services utilized within the caching environment of the application provide seamless and transparent access to data residing within the data store while managing the applications' memory usage in optimized manners.

BRIEF DESCRIPTION OF THE DRAWINGS

FIG. 8 is a diagram of an example listing table associated with the database of FIG. 7, according to an example embodiment.

FIG. 9 is a diagram of an example users table associated with the listing table of FIG. 8 and the database of FIG. 7, according to an example embodiment.

DETAILED DESCRIPTION

Figure 1:
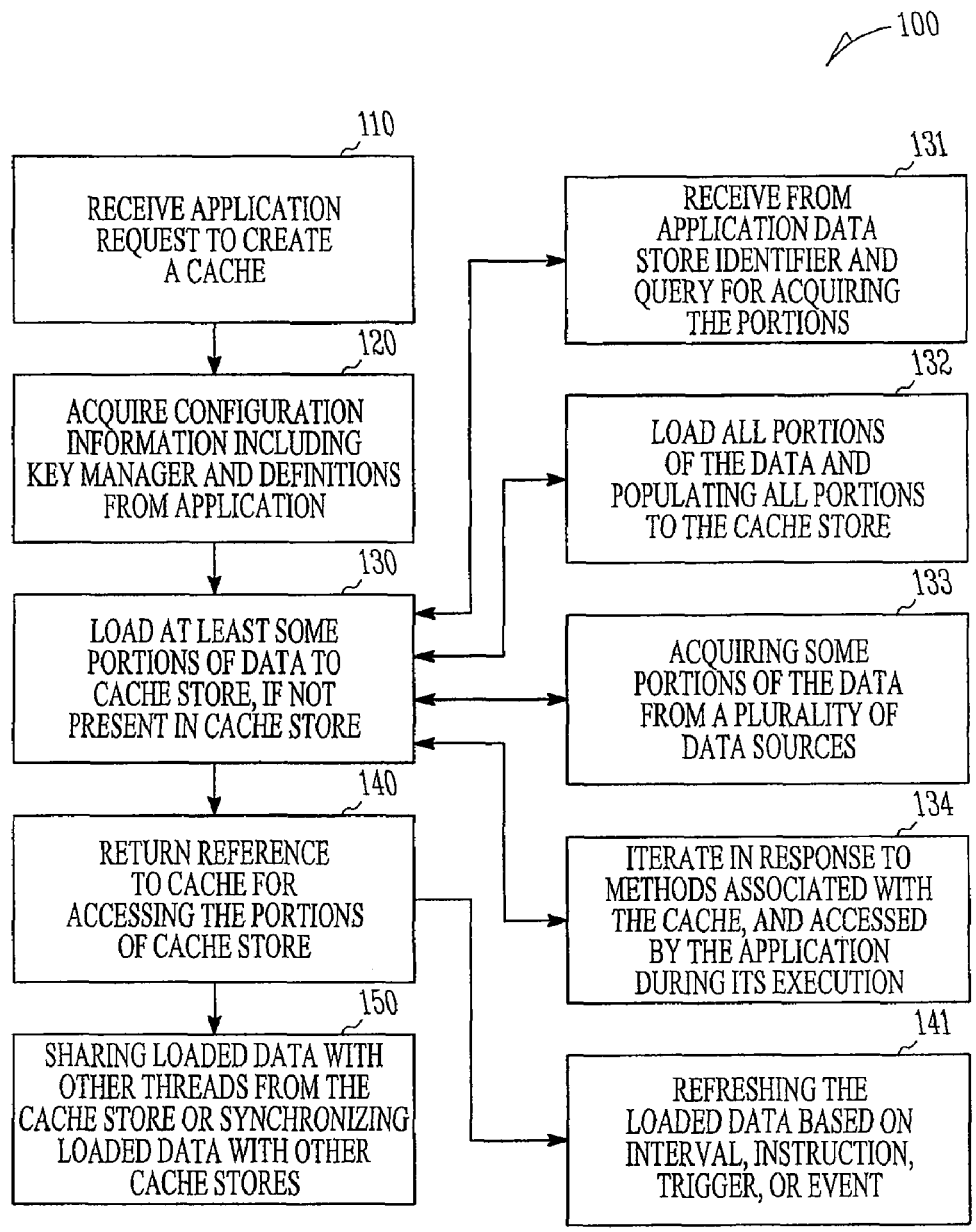
FIG. 1 is a diagram of a method for custom caching, according to an example embodiment.

FIG. 1 is a diagram of a method 100 for custom caching, according to an example embodiment. The method 100 (hereinafter "custom-cache service") is implemented in a machine-accessible or readable medium and is accessible over a network. The network may be wired, wireless, or a combination of wired and wireless. The processing of the custom-cache service provides customized caching to applications. The applications are written by developers using an Application Programming Interface (API) that accesses the processing of the custom-caching service.

In an embodiment, the API which interfaces applications to the custom-caching service is implemented in an Object-Oriented (OO) fashion. Accordingly, application source code includes class files that provide the API and that reference different aspects and features of the custom-caching service through objects which are defined in classes and each class has a variety of methods which access the features. The objects abstract and encapsulate different aspects associated with caching. The API provides application-specific environments which can custom control and access different features associated with caching; these features and control have traditionally been unavailable to developers of applications.

Each application processes on a machine with its own processing space or memory heap. A single application may have a plurality of threads that share the same heap. Each thread may independently interact with the custom-caching service. Alternatively, collections of threads may jointly interact with the custom-caching service. Moreover, the custom-caching service may synchronize data associated with different applications having different heaps.

The custom-cache service provides instances of caches to the application threads. As used herein a cache is intended to include an abstracted and encapsulated version of a cache store. The cache store includes memory locations within heaps of the application threads. The application threads define their caches and access them through the API which interacts with the custom-cache service. In this manner, control over the actual cache stores is transparent to the application threads and managed by the custom-cache service. Accordingly, memory management of an application thread's heap can be delegated to the custom-cache service while access control is provided through higher-level interfaces associated with the API, which is directly accessible to the application threads.

In addition to provide customized caching, embodiments of the custom-caching service reduces the load on data stores. This is so, because transactions to the data store are substantially reduced by pre-acquiring data frequently used by threads in single transactions to the data store and by sharing frequently used data across multiple threads through a single cache store. As a result, threads that perform numerous data store transactions can reduce the number of their transactions to the data store. Moreover, because data consumed by the threads are immediately available when used from the cache store, the processing throughput of the threads can be substantially improved.

The custom-caching service may support two types of caches: a global cache and a thread local cache. The threads have control through calls to the API to define the type of cache that best suits the programming environment of the threads. A global cache includes data within its cache store that may be shared across multiple threads of an application. Data of a global cache is typically immutable; meaning that the data is typically static to semi-static in state and refreshed at intervals based on configurable policies enforced by the custom-caching service. A thread local cache includes data within its cache store that is consumed and accessed only by a specific thread that creates the thread local cache. Furthermore, a single thread may utilize both a global cache and a thread local cache. Data within a thread local cache may be changed, dynamic, and refreshed based on instructions issued by the thread that created the thread local cache.

Initially, an application uses a call selected from the API to declare an instance of a cache within the programming logic of the application. The program also uses a variety of other calls within its programming logic to drive the processing of the custom-caching service. The processing of the custom-caching service is activated and executed during the execution of the application.

With this example context, the processing of the custom-caching service is now described with respect to FIG. 1. Accordingly, at 110, the custom-caching service receives a request from the application to create a cache. Initially, the cache is null having no data. At 120, the custom-caching service receives configuration information from the application for the cache. In an embodiment, the configuration information is received when the cache is created for the application; allowing the constructor of the cache to accept optional parameters from the application which can include the configuration information. The configuration information includes a pointer to a key manager and the key manager has one or more key definitions.

Initially, before supplying configuration information, the application defines a key manger that includes one or more key definitions. The key definitions may be viewed as an application supplied or pre-configured service or object for key types, such as an identifier used within a data object to uniquely identify that data object. For example, one key type might be a social security number (SSN) field name of a data object that is a customer record from on online merchant's customer database. Each key definition accepts a value associated with a piece of data assigned to a specific key type. For example, a particular key definition may accept the following parameter 555-55-5555, where the particular key definition is associated with a type SSN. In response to the value supplied to the key definitions, the key definitions generate a unique key. The key manager also knows how to accept a data object, parse it, and call each unique key definition associated with the different key types included within that data object. In some embodiments, the key manager is a generic object that is simply configured within the application by accessing the API to return a pointer to an instance of a generic key manager.

The configuration information may include a variety of information, such as an identifier for a data source and a mechanism, such as a search query, for acquiring a subset of data from the data source. In an embodiment, the custom-caching service may provide a library of generic or known data sources having generic instances of key managers. In these embodiments, the application can supply configuration information by identifying through the API the generic data sources and/or the generic instances of key managers. Thus, the application may directly or indirectly supply the configuration information acquired, at 120, by the custom-caching service.

At 130, the custom-caching, service loads or populates portions of data into a cache store associated with the newly created cache. Again, the cache store is not directly accessible to the application. The application uses calls within its programming logic to define, configure, and access a cache. The custom-caching service manages and maintains the data and the cache store, operations to set, get, write, flush, and/or update the data are provided through the API to the application for instructing the custom-caching service to act on the cache store on the application's behalf.

During a load, the custom-caching service passes a data object or a portion of data to each key definition associated with that object through the key manager that was supplied by the application. The key definitions for each key type parse the data object and extract the necessary values for form their respective keys. This results in one or more keys from the key definitions. These keys are used within an index of the cache store. Each index entry includes a key and a pointer to where the data object physically resides within the cache store.

The portions of the data may be loaded by the custom-caching service into the cache store in a variety of manners. In an embodiment, at 131, the custom-caching service may have received via configuration information an identifier to a data store (e.g., database, collection of data bases organized as a data warehouse, directories, electronic files, or various combinations of the any of these) and a query, which defines the portions of data to be loaded into the cache store.

In an embodiment, at 132, the custom-caching service may be instructed by the application to load all portions of the data into the cache store. This is useful when the cache is a global cache and where the volume associated with the data is not excessive and is manageable within the heap or cache store.

In another embodiment, the custom-caching service may be instructed by the application to load the portions directly at a given point in time during the execution of the application. This is useful when the cache is a thread local cache and where the volume of the data is perhaps excessive and it is desired to have only a portion in memory at any one time or where the data is going to be changed by the application. It may also be that the application wants be sure that when it instructs the custom-caching service to load a specific portion of the data that the portion is going to be as up-to-date as is possible.

Additionally, at 133, some portions of the data may be acquired by the custom-caching service from a plurality of perhaps disparate data sources. For example, the application may load data from one database for some data types being consumed by the application and simultaneously add data from one or more different databases for other data types being consumed.

Control of data types, data sources, and loading conditions of data which is loaded into the cache store is delegated to the application through calls to the API within the programming logic of the application. Some control is defined by the operations taken by the application, such as when the application uses an API call or operation associated with a global cache, implying that the all the data is to be immediately loaded by the custom-caching service into the cache store. Other control is more explicitly exercised by the application, such as when the application accesses calls or operations associated with a thread local cache, indicating that the application is assuming direct control over when data is loaded and/or modified within the cache store.

In an embodiment, at 134, the custom-caching service may iterate the load processing in response to methods associated with the cache. These methods are accessed via the API during the execution of the application. Again, this scenario is typically indicative of a thread local cache where the methods are calls or operations of the API and where the application selectively desires to perform loads during certain execution states of the application, but may also be used to load a global cache as data is demanded, assuming the data in the data source (e.g., data store, database, etc.) is typically static or semi-static.

At 140, the custom-caching service returns to the application a reference to the cache. The application is now free to perform a variety of operations on the data loaded within the cache store via accessing methods associated with the reference to the cache. To do this, the application will call specific key definitions within its programming logic and pass values for specific key types. The key definitions return a key that is symmetric with a key produced previously during the load by the custom-caching service. The combined application-generated key and the reference to the cache provide enough information to the custom-caching service for locating the appropriate cache store associated with the cache reference and for locating the appropriate data within the cache store. Again, the application-supplied key provides a direct location within the cache store index and that location includes a pointer to the physical location of the data desired by the application.

Once the portions of the data are indexed and loaded within the cache store, the custom-caching service may also, at 141, refresh, flush, or update the data or selective portions of the data within the cache store or to a data store, such as when an update is being performed. A variety of mechanisms may drive the custom-caching service to perform these types of operations such as when intervals for performing these operations are configured into the custom-caching service or defined within a policy that is dynamically enforced by the custom-caching service. Other techniques may include performing the operations after receiving a specific instruction from the application, performing the operations after receiving an event trigger raised by a data store when a field or table of the data store is modified, and/or performing the operations after receiving an event raised by a global administrator service that communicates with the custom-caching service.

Some of the processing described above prior to 140 may have or have not occurred before step 140. For example, data may not have been loaded to the cache store and index keys to portions of the data may not have been established. In this manner, the number and arrangement of the processing blocks of FIG. 1 are not intended to impart any particular sequence.

As stated above and as indicated, at 150, in some embodiments where the cache is a global cache the custom-caching service may share the cache store and the data loaded therein with other threads of the application. The threads acquire the reference to the cache from the application or parent thread and may access the cache store through the reference as desired.

In still another embodiment, also at 150, the custom-caching service may synchronize loaded data within the cache store associated with the application's heap with other loaded data within other cache stores associated with different applications having different programming heaps. This may be useful when the same data acquired from the same data source is loaded within two different cache stores and there is a desire to maintain synchronicity of the data state.

Figure 2:
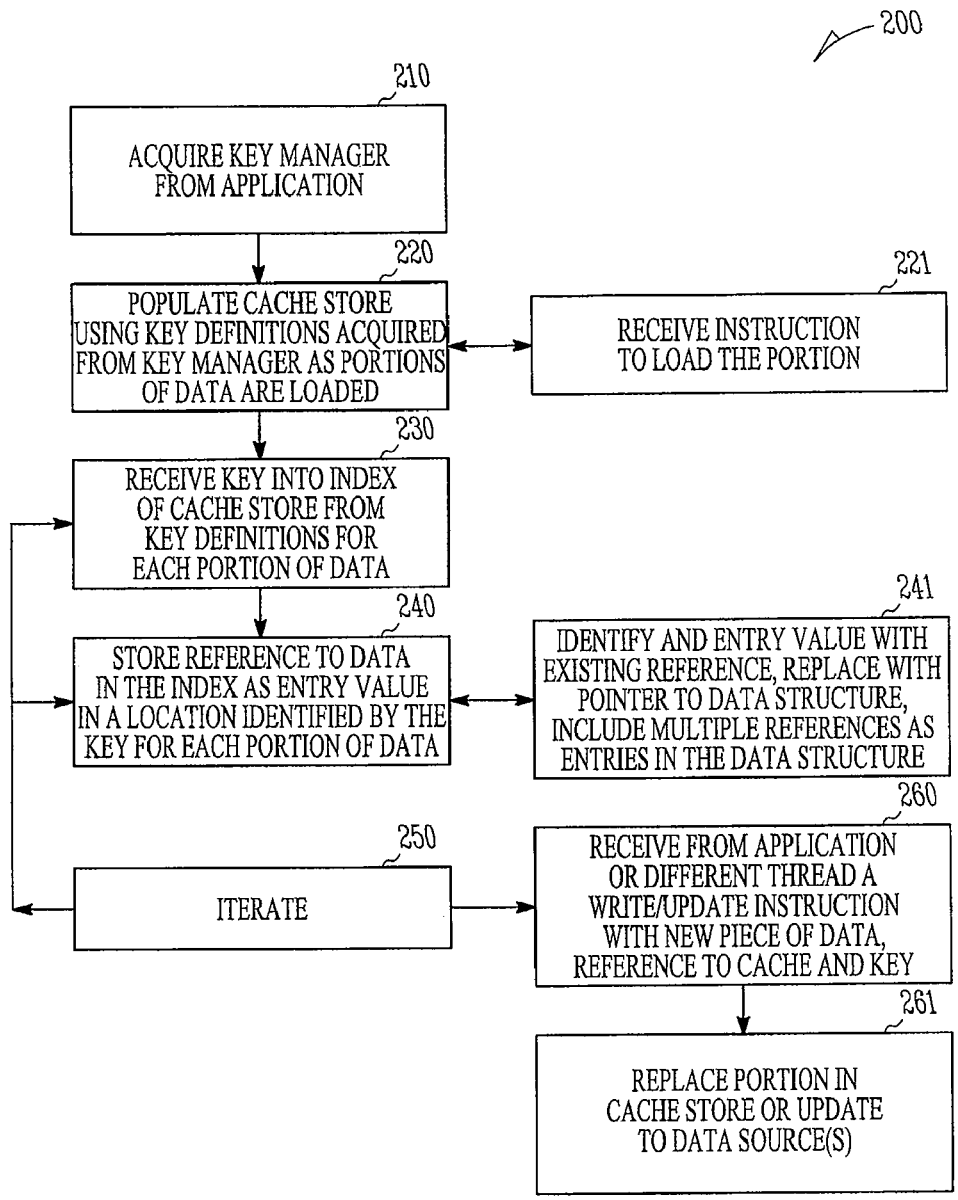
FIG. 2 is a diagram of a method for key management within a custom cache, according to an example embodiment.

FIG. 2 is a diagram of a method 200 for key management within a custom cache, according to an example embodiment. The method 200 (hereinafter "key service") is implemented within a machine-accessible and readable medium and is accessible over a network. The network may be wired, wireless, or a combination of wired and wireless. The key service performs a variety of techniques for managing keys associated with an application and a custom-caching service, such as the custom-caching service represented as the method 100 of FIG. 1. In an embodiment, the key service is implemented within the custom-caching service as an OO component or a sub-service associated therewith.

As will be demonstrated below, the key service provides novel features that permit data stored within cache stores to be uniquely associated, grouped, indexed, shared, and retrieved from the cache store. In this manner, the key service extends the functionality of the custom-caching service of FIG. 1 providing added flexibility to applications. Again, some features presented herein and below may be accessed via the API of the custom-caching service and other features may be internal to the custom-caching service.

At 210, the key service acquires a key manager for a particular cache. Acquisition may be achieved via a pointer supplied by the application to the key service. The key manager includes a variety of key definitions. The key definitions provide symmetrical keys between the application and the key service. Each key definition operates on a particular key type associated with a data object. A key definition returns a symmetric version of a key in response to receive a particular value for a particular key type. The keys returned from the key definition provide name spacing that delineates between different key types for the same data object type, and delineates between different key types for different data object types, so that keys with equivalent data, which pertain to different values and/or objects, can be delineated between the index. This is typically achieved through different actual class types for the key types, which are used during index lookup. The key definition may be supplied the direct data, or may parse the data from an instance of an object that it relates to, in order to create a key object.

At 220, the key service populates a cache store by using unique key definitions acquired from the key manager or processed through the key manager. Moreover, for each portion of data received in a data object for loading, an appropriate key definition is processed. In an embodiment, at 221, the key service may initiate the population processing in response to an instruction received from the application. In this manner, the application may perform on demand loading, such as when the application is using a cache associated with a thread local cache, or loading a global cache based on demand for data.

At 230, a key is received from an appropriate key definition for each portion of the data during the population, at 220. The key is consumed by the key service for acquiring a specific unique location within an index associated with the cache store. At 240, that key is stored in the index along with a reference to the data associated with the portion of the data that is being processed. The reference is stored within an entry value of the index; the location of the entry value within the index is acquired via the key.

The processing at 220, 230, and 240 is iterated, at 250, for identified key types and key definitions associated with the data. Thus a single piece of data or single data object may have a plurality of keys and entries housed in the index of the cache store and each of those keys include the reference to the physical location of the data object within the cache store.

At 241, the storing of the reference may be modified to accommodate collection keys. A collection key is provided by a special type of a key definition. A collection key is a logical grouping of portions of the data associated with same key type. For example, suppose that the application defined via a key definition that each set of data returned from the announcement data store where announcements associated with the same ISP be grouped into buckets, and the buckets associated with a collection key. In the example, maybe 100 announcement records are grouped into a first bucket with a first collection key because they all have an ISP value of "AOL" and another 10 customer records are grouped into a second bucket having a second collection key because they all have an ISP value of "Roadrunner." The groupings that define a collection key may be established by the application through the API using key definitions, operations, or calls. One appreciates, that this is a powerful feature since it can, among other things, preorder data within the cache and group data into buckets, such that the order and buckets can be later accessed without having to perform an additional operation with the application when the order or buckets are needed.

To accommodate this novel collection key there may be multiple portions of the data that have the same key to the same entry value within the index. The key service knows that the key definition used to acquire the keys was a collection key definition. Therefore, the key service will handle the situation during subsequent iterations of the key service when it encounters a portion of data that indexes to an already populated entry value which already has a reference included therein. Thus, at 241, the key service will acquire the pre-existing reference, which will typically be a list type structure, and add the pointer of the new data object to the list. If an entry does not already exist for a collection key entry, then it will create a new list structure and add the new data object to this list and put the collection key and list into the cache store. Thus, the duplicate references are populated as a plurality of entries within the data structure. In this manner, the application has logically grouped portions of its data loaded within the cache store into collections for future ease of reference and direct access.

In some embodiments, an application may try to access data not yet loaded within the cache store. In these cases, the key service may return a null reference, indicating that an entry does not exist, or generate an exception. At this point, the application can attempt to acquire the data from a data store and then load the data into the cache store through methods associated with the cache reference and then properly acquire the data. Additionally, if the data is not found in the data store, then the application can put a marker object into the cache for this particular key, to indicate that an object does not exist for this key, so that subsequent thread requests will not bother calling the data store to took for the data that does not exist, thus reducing load on the data store. Lazy loading may occur with both global cache types and thread local cache types.

Once data is loaded into the cache store, the application can retrieve selective portions of the loaded data by passing the reference to the cache and a selective key within an API call or operation to acquire the data from the cache store. This is achieved by using the selective key to locate the entry value within the index of the cache store, acquiring the populated reference, and retrieving the selective portions of the loaded data from a physical location within the cache store identified by the reference.

In an embodiment, the cache may also receive from a different thread of the application a specific key into the index along with a reference to the cache. In response to this, the key service returns the data acquired by traversing the reference located at the entry value location within the index pointed to by the specific key, which was supplied by the different thread.

In yet another embodiment, at 260, a write or update operation may be subsequently received from either the application or a different thread of the application. The operations include a reference to the cache, a new piece of data, and a key. The write operation, at 261, acquires the appropriate index entry value location pointed to by the key, and acquires the reference to the location of the data within the cache store, and replaces the data within the cache store with a new piece of data. This update is realized by all key entries for this object in the index, as they hold a reference to a cache entry holder object, which has a reference to the data object, which is what is actually updated; thus, updating the data object reference for one key cache entry updates it for all key entries for that object. A write occurs with a cache reference associated with a thread local cache. An update operation acquires the matching location in the same manner, but uses other services to write the matching data in the cache store to one or more data sources or data stores, or is handled externally at the discretion of the application.

Figure 3:
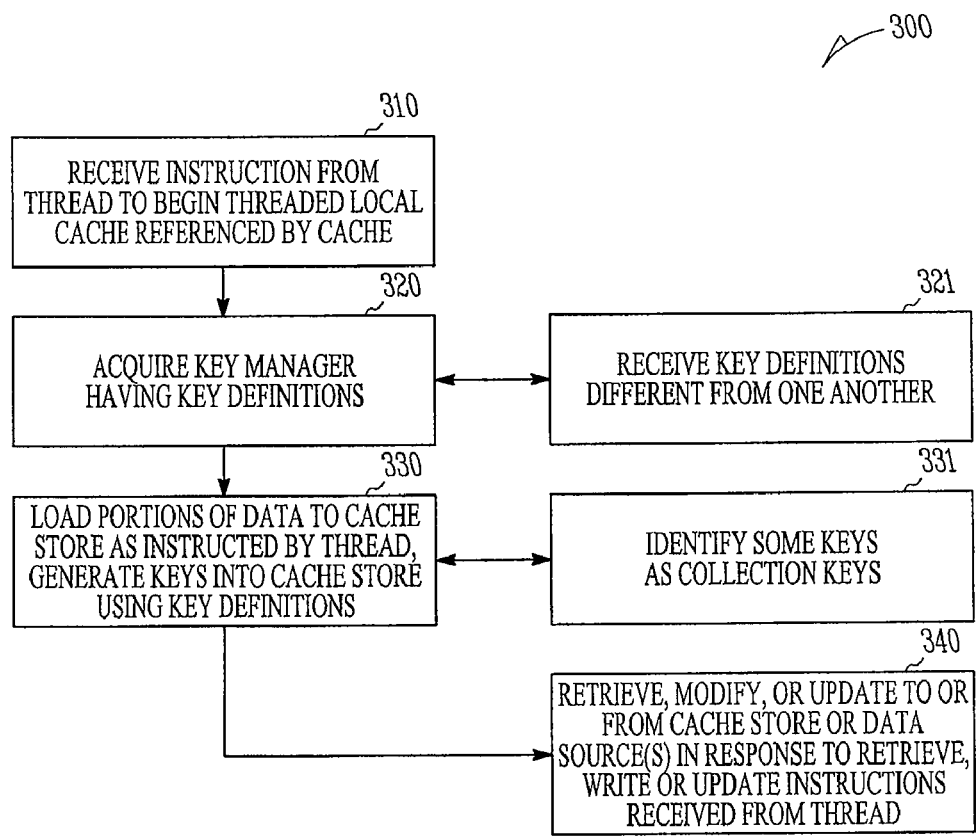
FIG. 3 is a diagram of another method for custom caching, according to an example embodiment.

FIG. 3 is a diagram of another method 300 for custom caching, according to an example embodiment. The method 300 (hereinafter "thread local cache service") is implemented in a machine-accessible and readable medium and is accessible over a network. The network may be wired, wireless, or a combination of wired and wireless. In an embodiment, the thread local cache service represents a sub-service or an OO component of the custom-caching service represented by the method 100 of FIG. 1. Additionally, the thread local cache service may also integrate and interface with the key service represented by the method 200 of FIG.

At 310, the thread local cache service, receives a request from a thread to obtain a reference to its thread local cache. The thread local cache instance is created for a thread if one does not already exist within the thread local cache service for it. The thread local cache instance receives an instruction from the application thread to begin caching data objects that the thread encounters during its processing. This instructs the internals of the thread local cache instance to enable operations or methods on this thread cache instance to read and put objects in the thread local cache's cache store. It is appreciated that other techniques are permissible to obtain an instance of a thread local cache. For instance, in an OO implementation, the cache may be utilize a specific thread local cache constructor, may pass specific parameters or identifiers to a generic cache constructor, or simply issue a begin or some other type of operation that identifies a generic cache as being associated with a thread local cache.

At 320, the thread local cache acquires a key manager having key definitions from an application thread as it visits the objects that handle the loading of specific object types into the thread local cache. Techniques for generating and providing key definitions were discussed in detail with respect to the key service of FIG. 2. However, in the case of the thread local cache, the key manager or a specific key definition are received by the thread local cache when the thread wants put an object into the thread local cache. Thus, key managers and their key definitions are discovered during runtime as objects are put into a thread local cache.

Additionally, in some embodiments, at 321, some key definitions received from the application thread by the thread local cache may be for different object types. This means that multiple types of data objects from multiple data sources may be defined within the thread's thread local cache; such key definitions are significantly different from one another and are specific to the different object types.

At 330, the thread instructs the thread local cache to selectively load portions of data to the cache store via API calls on thread local cache. At this point, the thread local cache service interactively and in a piecemeal fashion, as directed by the thread, assembles the desired data into the cache store using the key manager and its key definitions (in manners discussed above) and in the process constructs an index into the cache store for acquiring the desired data. In addition, at 331, the key definitions supplied at 320 may define a number of the key definitions as collection keys. Examples of a collection keys were provided above with respect to the key service of FIG. 2.

At some point during the execution life-cycle of the thread, it may reference, at 340, some specific portions of the loaded data within the cache store. A reference may be made with a variety of API operations or calls for such things as, by way of example only, getting, flushing, refreshing, reading, writing, and/or updating. The API operations or calls include parameters associated with a reference to the thread local cache and keys. The keys are symmetrical between the thread and the thread local cache service because both them used the same key definitions to acquire the keys. The keys possessed by the thread local cache service provide locations within an index of the cache store and the entry values identified at those locations includes references the actual locations within the cache store where the desired data resides.

For example, at 340, the thread may utilize API calls or operations to modify some portions of the loaded data or to update data sources associated with some portions of the loaded data housed and managed by the thread local cache service via the thread local cache reference. To do this, the thread local cache service utilizes the reference to the thread local cache to identify the specific cache store and the keys into index locations. Armed with this information, the thread local cache can use the keys to acquire the desired portions of data for purposes of retrieving, flushing, writing new data, updating the existing data to one or more data stores, etc.

It should be noted that the thread local cache service may manage a plurality of thread local caches for a variety of threads. In a similar manner, the custom-caching service and the key service of the FIGS. 1 and 2 may also manage a plurality of thread local caches for a variety of threads and/or a plurality of global caches for a variety of applications.

Figure 4:
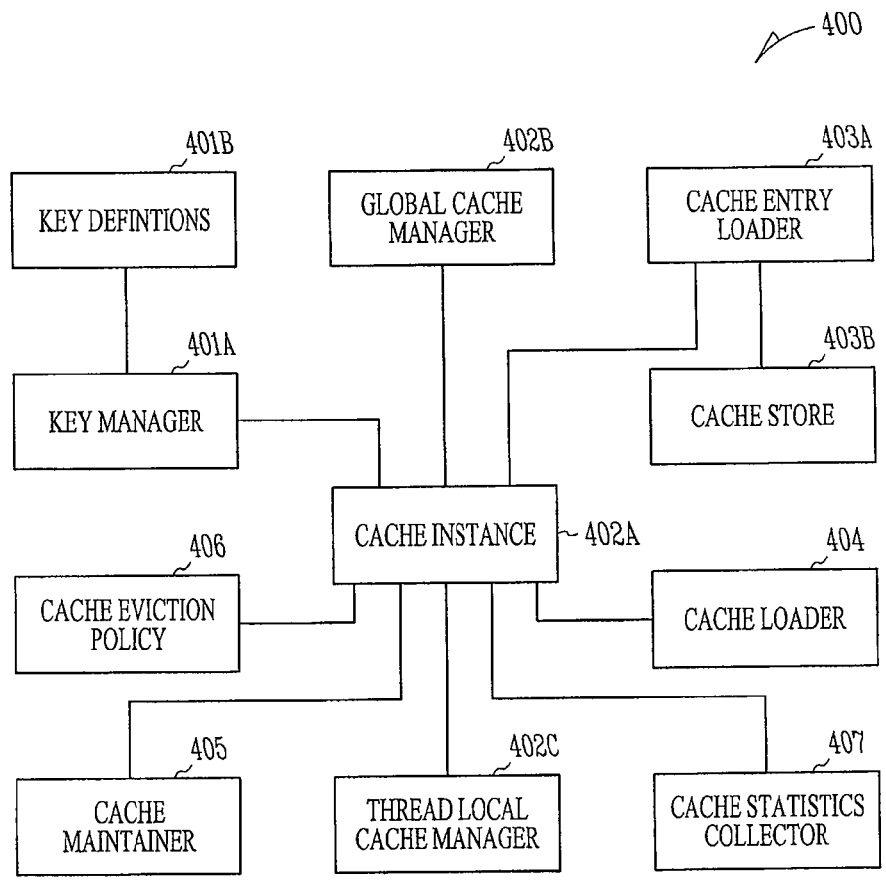
FIG. 4 is a diagram of a custom cache system, according to an example embodiment.

FIG. 4 is a diagram of a custom cache system 400, according to an example embodiment. The custom cache system 400 is implemented in a machine-accessible and readable medium and is accessible over a network. The network may be wired, wireless, or combinations of wired and wireless. In an embodiment, the custom cache system 400 implements within its components, among other things, the custom-cache service, the key-service, and the thread local cache service associated with the methods 100, 200, and 300 of FIGS. 1-3, respectively.

The custom cache system 400 abstracts cache stores (memory heap space) to a series of higher-level references referred to as caches. An API associated with the caches permit applications or threads of an application to custom control and insert, remove, modify, and/or write data having a variety of data types to and from the cache stores via references to the caches and via calls to methods or operations of the API. The backend processing of the API calls drive some of the processing associated with the custom cache system 400. Other processing of the custom cache system 400 may be driven by policies or administrator interfaces communicating with the thread local cache service.

The components of the custom cache system 400 are presented for purposes of illustration only and are therefore not intended to limit embodiments of the custom cache system 400. Accordingly, some components may be omitted, some other components may be added, and some collections of the components may be combined into single components. All such arrangements are intended to fall within the scope of the embodiments presented here, if such arrangements provide for the novel techniques for custom caching as described herein.

In one implementation, the custom cache system 400 is implemented as an OO system having an OO API, which is accessible to the applications and the threads of an application. The objects may be defined within a programming language as classes having public methods accessible to the applications and threads and protected methods accessible to certain objects defined within the custom cache system 400. The classes may inherit from one another and may permit polymorphism. Of course it is recognized that any software implementation of the custom cache system 400 is intended to fall within the scope of the embodiments presented herein, thus the custom cache system 400 may also be implemented in other manners, such as a series of services defined with traditional structured programming, and the like.

The custom cache system 400 includes a key manager 401A, key definitions 401B, a global cache manager 402B, a thread local cache manager 402C, a cache entry loader 403A, a cache store 403B, and a cache loader 404. In some embodiments, the custom cache system 400 also includes a cache maintainer 405, a cache eviction policy 406, and/or a cache statistic collector 407. The operations and features of the custom cache system 400 operate on and through instances of caches 402A. Each of these will now be discussed in turn.

The key manager 401A is responsible for managing key definitions 401B. The key manager 401A and the key definitions 401B and configured and or created through API operations processed by an application or thread in connection with an instance of a cache 402A. The key definitions 401B know how to parse different types of data or data objects to acquire values to generate keys. Each key definition 401B is associated with a specific key type and when supplied a value for data associated with a specific key type generates a symmetric key. The key is symmetric because both the application and the cache entry loader 403A can produce identical keys when using the same key type and the same value. Some key definitions may permit the creation of keys associated with logical collections of data. Techniques for achieving this were discussed in detail above.

The cache managers 402B and 402C create and manage instances of caches 402A with cache stores 403B on behalf of the application threads. The cache managers 402B and 402C return references to created cache instances 402A to the application threads. The application threads use the cache instance 402A reference to perform operations via its API. A cache instance 402A may be a global cache that is shared between threads or a cache may be a thread local cache that is exclusively associated and accessed by a particular thread. The cache managers 402B and 402C interact with the other components of the custom cache system 400 via the references to specific cache instances 402A for purposes of managing the cache stores 403B and maintaining their integrity.

The cache entry loader 403A is provided references to the key manager 401A and cache loader 404 by the cache instance 402A, through which it accesses the key manager 401A and its key definitions 401B that it contains. The cache entry loader 403A holds the reference to the cache store 403B. The cache loader 404 is responsible for determining where and how to acquire data from a variety of data sources, where the data is potentially associated with a variety of disparate data types or objects. Thus, the data access layer is abstracted and hidden from the application threads. This makes the application logic that interacts with the cache instance 402A more portable and less coupled to the specific data sources and their methods for acquiring data, such that should a data source change its interface the application threads would still be operational because it is the cache loader 404 that manages data stores and their interfaces.

The cache loader 404 may cause all data identified by an application to be loaded into the cache store 403B when initially called, such as when the cache instance 402A referenced by the application thread is a global shared cache. The cache instance 402A makes this happen via a call to the cache entry loader 403A; and the cache entry loader 403A interacts directly with the cache loader 404 to obtain data that the cache loader 404 determines should be placed in the cache store 403B; and then the cache entry loader 403A subsequently loads the data into the cache store 403B. Alternatively, data may be loaded into the cache store 403B interactively or in a piecemeal fashion as instructed by the application thread via API calls on the cache instance's 402A public interface issued by the application thread, such as when the cache instance 402A referenced by the application thread is a thread local cache or is a lazy loaded global cache.

The cache loader 404 acquires data from the data sources associated with the data types or objects and causes units, records, or portions of the data acquired from the data sources to be indirectly passed on to the cache entry loader 403.

The cache entry loader 403A interacts with the key manager 401A to acquire symmetric keys for data being loaded. The keys identify locations within an index being maintained for the cache store 403B. Each location has a reference to specific data loaded in the cache store 403B. In some instances, a location may include a pointer to a data structure, where the data structure includes references to multiple data within the cache store 403B. This is done when a key definition 401B provided collection keys for some of the data, as was discussed above in detail.

The cache instances 402A interacts with API calls initiated by the application threads to drive the loading, retrieval, and other potentially volatile operations (e.g., writing, flushing, refreshing, etc.) against the data included within the cache stores 403B. The volatile operations by default are constrained on global cache instances 402A and not on thread local cache instances 402A and are enforced by the cache instances 402A should one of these operations be attempted by an application thread against a global shared cache type with this default configuration. The operations initiated by the application threads from the API can include a variety of parameters, such as a reference to a cache, a key, a key manager, and a data object. Moreover, if the operation dictates, the cache instance 402A may also consume a key for purposes of looking up in the cache store 403B a specific piece of data identified by the application thread via the key. These operations are driven via the cache instances' 402A interfaces.

In an embodiment, the custom cache system 400 may also include a cache maintainer 405. The cache maintainer 405 interacts directly with the cache instance 402A and is responsible for managing the state of the data in the cache instance 402A via configured refresh operations on global caches 402A. The cache maintainer 405 will initiate a refresh sequence using a background thread based on configuration, such as time. During this refresh sequence it will call the cache instance 402A, which will subsequently call the cache loader 404, which will determine if and what portion of the cache should be flushed and/or updated. The cache instance 402A will then create a new cache entry loader 403A instance and cache store 403B instance and begin to populate it with the data provided by the cache loader 404. Once the new cache store 403B has been successfully loaded, the old cache entry loader 403A reference will be replaced with a reference to the new cache entry loader 403A instance containing the new cache store 403B. This approach to refresh allows for the application threads to continue to use the cache white the new cache entry loader 403A and cache store 403B are created, and it allows for these objects to be instantaneously replaced; thus, allowing for uninterrupted access to cache data for the application threads even during a refresh operation. Again, a global cache (also known as a shared cache) is a cache instance 402A with an associated cache store 403B, where data indexed therein is shared between pluralities of threads of a same application.

In still another embodiment, the custom cache system 400 may also include a cache eviction policy 406. The cache eviction policy may be consumed and evaluated by the cache instance 402A of the cache store 403B for purposes of determining the conditions and/or events under which portions of the data within the cache stores 403B are to be removed from the cache stores 403B and/or updated to one or more data sources associated with the portions of the data. In some cases, the cache eviction policy 406 may be an electronic data structure or file, such as an extensible markup language (XML) formatted file. In other cases, the cache eviction policy 406 is dynamically communicated from a global administrator service.

In still another embodiment, the custom cache system 400 may also include a cache statistics collector 407. The cache statistics collector 407 collects statistical data from the caches regarding usage and efficiency and reports the same to a configurable statistic collection service.

Figure 5:
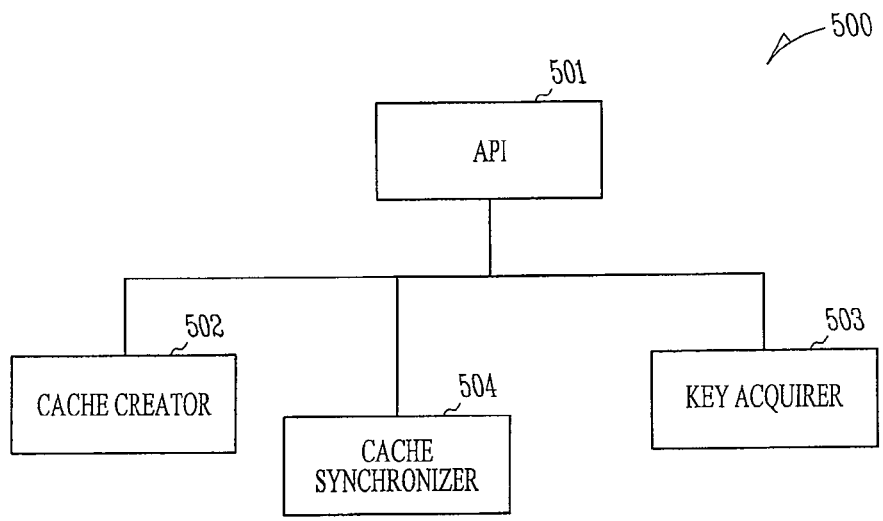
FIG. 5 is a diagram of another custom cache system, according to an example embodiment.

FIG. 5 is a diagram of another custom cache system 500, according to an example embodiment. The custom cache system 500 is implemented in a machine-accessible and readable medium and is accessible over a network. The network maybe wired, wireless, or a combination of wired and wireless. The custom cache system 500 provides an alternative view of the custom cache system 400 of FIG. 4.

The custom cache system 500 includes an API 501 and a cache creator 502. In an embodiment, the custom cache system 500 may also include a key acquirer 503 and/or a cache synchronizer 504. Each of these will now be addressed in turn.

The API 501 includes a suite of definitions, operations, calls, or methods which are available to a developer to include in his/her code associated with an application or a thread of an application. The definitions define abstracted views of cache stores via cache definitions. Each cache definition includes a set of operations for performing some operation against the cache store via references to a cache.

A cache can be of two types: a global shared cache and a thread local cache. Other operations may permit cache configurations to acquire data of application-defined types from a plurality of data sources. Still more operations may permit the communication of key managers associated with key definitions to be communicated. Some key definitions may be associated with collective keys. In yet other operations, gets, puts, sets, writes, refreshes, flushes, updates, and the like permit volatile and non volatile operations to be performed against data housed in the cache stores and referenced by the cache.

The front-end of the API 501 interfaces with applications or threads of an application. Conversely, the back-end of the API 501 interfaces or communicates with the cache creator 502 and optionally the key acquirer 503 and/or the cache synchronizer 504.

The cache creator 502 handles API 501 operations executed by the application or threads of the application. In an embodiment, the cache creator 502 is implemented within software on a machine-accessible and readable medium as a means for creating and managing customized caches. Examples of objects, services, and systems for achieving this were discussed above with respect to the methods 100, 200, and 300 and with respect to the system 400. Accordingly, these descriptions associated with these methods 100-300 and the system 400 are incorporated by reference herein as the means for creating and managing customized caches. Some customized caches are shared between the same threads of an application, while other ones of the customized caches are managed by specific threads to the exclusion of other ones of the threads.

In an embodiment, the some features of the cache creator 502 may be delegated to a key acquirer 503. The key acquirer 503 manages keys for the customized caches. In an embodiment, the key acquirer 503 is implemented in software within a machine-accessible and readable medium as a means for acquiring keys. The technique and features of managing and acquiring keys for customized caches where presented above with respect to the methods 100-300 and the system 400. Accordingly, the means for acquiring keys includes the descriptions and techniques presented above with respect to key creation, key definitions, and key management of the methods 100-300 and the system 400. In an embodiment, the means for acquiring keys 503 provides a symmetrical key between both the application or threads and the customized caches.

In yet another embodiment, the custom cache system 500 includes a cache synchronizer 504. The cache synchronizer 504 permits data associated with disparate cache stores (disparate heaps) to be synchronized with one another. In an embodiment, the cache synchronizer 504 is implemented in software within a machine-accessible and readable medium as a means for synchronizing data between numbers of disparate customized caches via their corresponding cache stores. The means for synchronizing data may be defined within policies communicated to the affected cache stores. Alternatively, the means for synchronizing data may be dynamically communicated by a global administrator service at predefined or dynamically instructed intervals.

It has now been demonstrated how custom caching can be achieved for purposes of improving processing throughput of an application and streamlining development time associated with developing the application. Additionally, the techniques presented herein also reduce the number of data store transactions that may be needed to process an application to completion. Thus, it is apparent that a significant reduction in data store transactions can be achieved when applications that access the data store employ the API and techniques presented herein.

FIGS. 6-10 are now presented and described for purposes of illustrating example environments and transactional architectures and arrangements within which the embodiments of this invention may be practiced. The example architectures and arrangements provide a few environments in which the embodiments of this invention may usefully be deployed; however, it is noted the embodiments presented above are not intended to be limited or constrained by the specific examples presented below.

Figure 6:
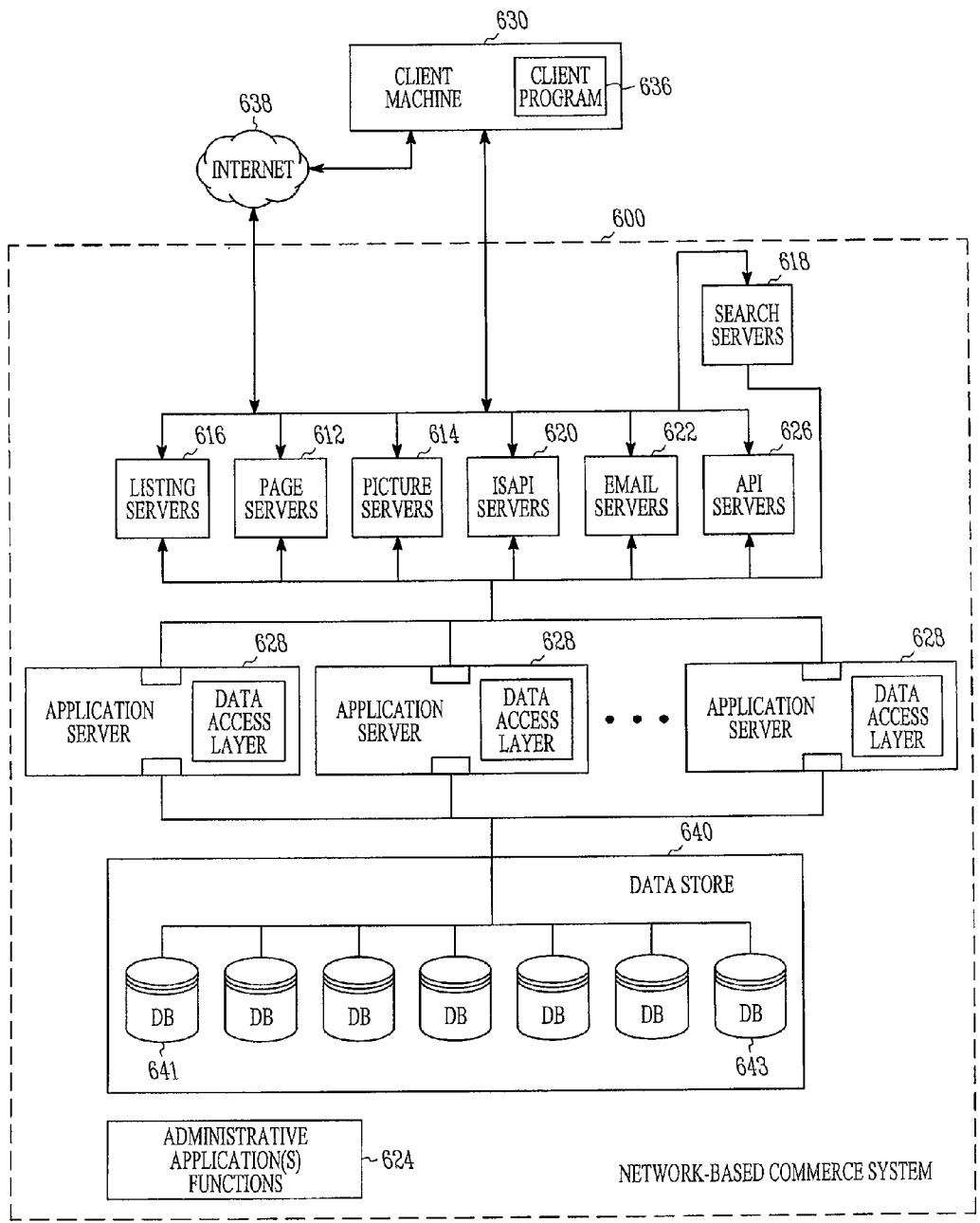
FIG. 6 is a diagram of example network-based commerce system or facility having the methods or systems of embodiments associated with the invention.

FIG. 6 is block diagram illustrating an example network-based commerce system or facility 600 wherein embodiments of the present invention may be deployed. While an example embodiment of the present invention is described within the context of the network-based commerce system 600, the invention will find application in many different types of computer-based, and network-based, facilities (commerce, transaction or otherwise).

The network-based commerce system 600 includes one or more of a number of types of front-end servers that may each include at least one Dynamic Link Library (DLL) to provide selected functionality. The system 600 may include page servers 612 that deliver web pages (e.g., mark-up language documents), picture servers 614 that dynamically deliver images to be displayed within Web pages, listing servers 616 that facilitate category-based browsing of listings, search servers 618 that handle search requests to the system 600 and facilitate keyword-based browsing of listings, and ISAPI servers 620 that provide an intelligent interface to a back-end of the system 600. The system 600 may also include e-mail servers 622 that provide, among other things, automated e-mail communications to users of the network-based commerce system 600.

in an embodiment, one or more administrative application functions 624 facilitate monitoring, maintaining, and managing the system 600. One or more API servers 626 may provide a set of API functions for querying and writing to the network-based commerce system 600. APIs may be called through the HTTP transport protocol. In an embodiment, information is sent and received using a standard XML data format. Applications utilized to interact (e.g., upload transaction listings, review transaction listings, manage transaction listings, etc.) with the network-based commerce system 600 may be designed to use the APIs. Such applications may be in an HTML form or be a CGI program written in C++, Perl, Pascal, or any other programming language.

The API servers 626, page servers 612, picture servers 614, ISAPI servers 620, search servers 618, e-mail servers 622 and a database engine server (e.g., provided by one or more of the application servers 628) may individually, or in combination, act as a communication engine to facilitate communications between, for example, a client machine 630 and the network-based commerce system 600; act as a transaction engine to facilitate transactions between, for example, the client machine 630 and the network-based commerce system 600; and act as a display engine to facilitate the display of listings on, for example, the client machine 630.

The back-end servers may include a database engine server, a search index server and a credit card database server, each of which maintains and facilitates access to a respective database.

In an embodiment, the network-based commerce system 600 is accessed by a client program, such as for example a browser 636 (e.g., the Internet Explorer distributed by Microsoft Corp. of Redmond, Wash.) that executes on the client machine 630 and accesses the network-based commerce system 600 via a network such as, for example, the Internet 638. Other examples of networks that a client may utilize to access the network-based commerce system 600 include a wide area network (WAN), a local area network (LAN), a wireless network (e.g., a cellular network), the Public Switched Telephone Network (PSTN) network, or like. The client program that executes on the client machine 630 may also communicate with the network-based commerce system 600 via the API servers 626.

EXAMPLE DATABASE STRUCTURE

Figure 7:
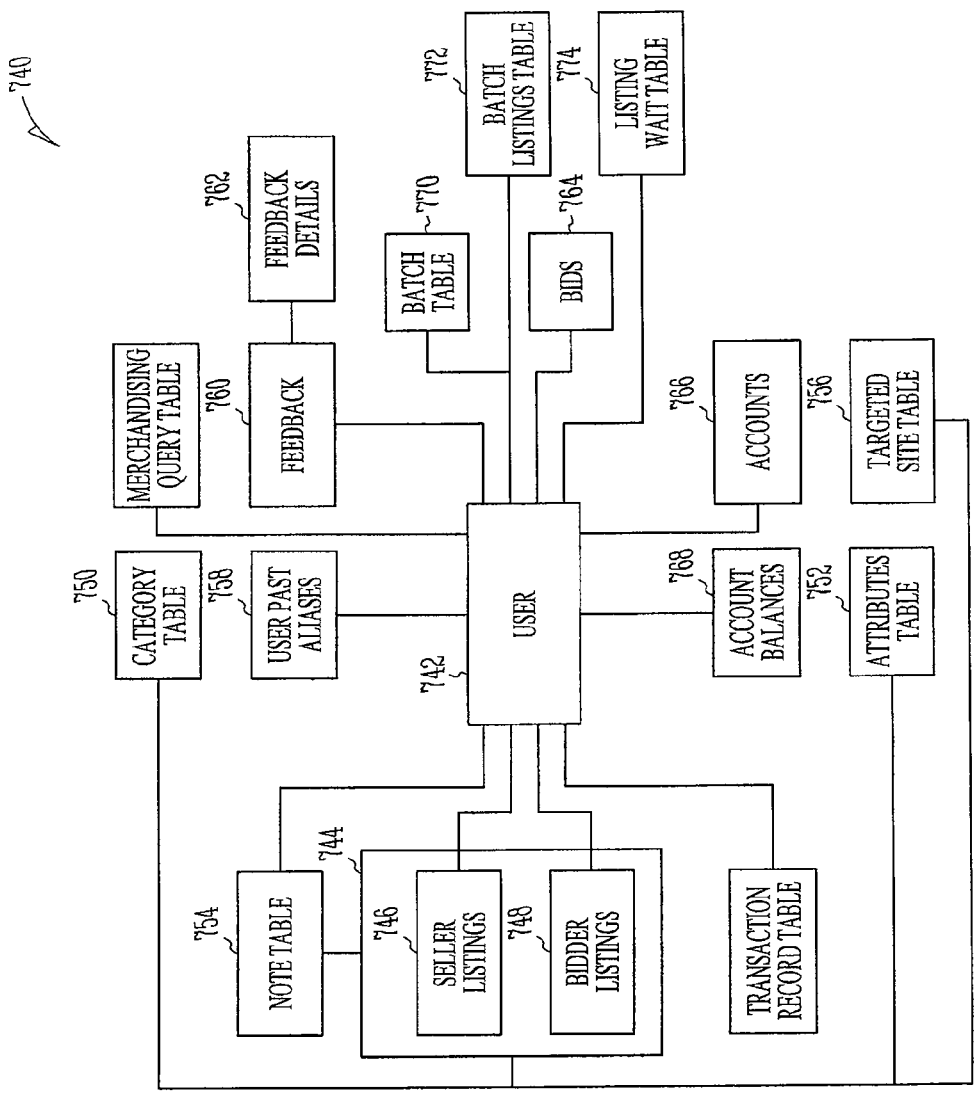
FIG. 7 is a database diagram illustrating an example database, which at least partially implements and supports the network-based commerce system of FIG. 6, according to an example embodiment.

FIG. 7 is a database diagram illustrating an example database 740, maintained by and accessed via the database engine server 728, which at least partially implements and supports the network-based commerce system 700. In an embodiment a database engine server may maintain a plurality of databases 740. For example, may maintain a master write database 741 (e.g., including a plurality of horizontally distributed databases), and a read-only database 743 that may, for example, allow loads to be balanced appropriately.

The database 740 may, in an embodiment, be implemented as a relational database, and includes a number of tables having entries, or records, that are linked by indices and keys. In an alternative embodiment, the database 740 may be implemented as collection of objects in an object-oriented database, as discussed by way of example in more detail below.

The database 740 includes a user table 742 that contains a record for each user of the network-based commerce system 700. An example record for each user is shown in FIG. 9. A user may operate as a seller, a buyer, or both, when utilizing the network-based commerce system 700. The database 840 also includes listings tables 744 (see FIGS. 8 and 9) that may be linked to the user table 742. The listings tables 744 may include a seller listings table 746 and a bidder listings table 748. A user record in the user table 742 may be linked to multiple listings that are being, or have been, listed or offered for sale via the network-based commerce system 700. In an embodiment, a link indicates whether the user is a seller or a bidder (or buyer) with respect to listings for which records exist within the listings tables 744.

The database 740 also includes one or more divisions in the form of categories provided in category tables 750. Each record within the category table 750 may describe a respective category. In an embodiment, listings provided by the system 700 are arranged in the categories. These categories may be navigable by a user of the network-based commerce system 700 to locate listings in specific categories. Thus, categories provide a mechanism to locate listings that may be browsed. In addition or instead, an alphanumeric search mechanism may be provided by the search servers 718 to allow a user to search for specific listings using search terms or phrases.

In an embodiment, the category table 750 describes multiple, hierarchical category data structures, and includes multiple category records, each of which describes the context of a particular category within the multiple hierarchical category structures. For example, the category table 750 may describe a number of real, or actual, categories to which listing records, within the listings tables 744, may be linked.

The database 740 is also shown to include one or more attributes tables 752. Each record within the attributes table 752 describes a respective attribute associated with a listing. In an embodiment, the attributes table 752 describes multiple, hierarchical attribute data structures, and includes multiple attribute records, each of which describes the context of a particular attribute within the multiple hierarchical attribute structures. For example, the attributes table 752 may describe a number of real, or actual, attributes to which listing records, within the listings tables 744, may be linked. Also, the attributes table 752 may describe a number of real, or actual, attributes to which categories, within the category table 750, may be linked.

The database 740 may also include a note table 754 populated with note records that may be linked to one or more listing records within the listings tables 744 and/or to one or more user records within the user table 742. Each note record within the note table 754 may include, among other things, a comment, description, history or other information pertaining to a listing being offered via the network-based commerce system 700, to a user of the network-based commerce system 700. The database 740 may also include a targeted site table 756 populated with targeted site records that may be linked to one or more listing records within the listings tables 744 and/or to one or more user records within the user table 742.

A number of other example tables may also be linked to the user table 742, namely a user past aliases table 758, a feedback table 760, a feedback details table 762, a bids table 764, an accounts table 766, and an account balances table 768. In an embodiment, the database 740 also includes a batch table 770, a batch listings table 772, and a listings wait table 774. The data may be partitioned across multiple database instances, and queries may have to be executed against multiple database instances and query results may need to be aggregated.

Figure 10:
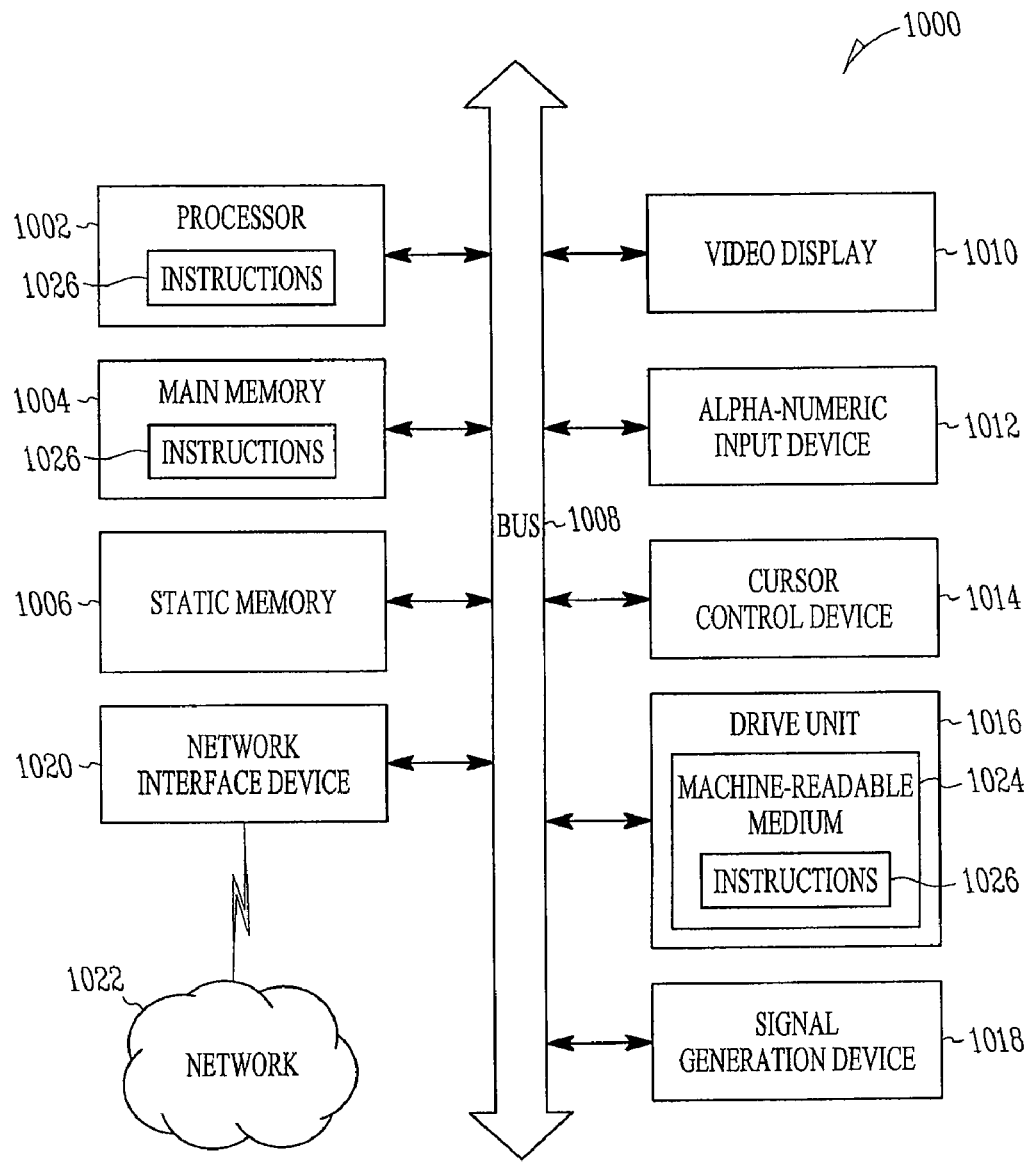
FIG. 10 is a diagrammatic representation of an example machine in the example form of a computer system 1000 within which a set or sequence of instructions, for causing the machine to perform any one of the methodologies discussed herein, may be executed, according to an example embodiment.

FIG. 10 shows a diagrammatic representation of a machine in the example form of a computer system 1000 within which a set or sequence of instructions, for causing the machine to perform any one of the methodologies discussed herein, may be executed. In alternative embodiments, the machine may comprise a network router, a network switch, a network bridge, Personal Digital Assistant (PDA), cellular telephone, a web appliance, set-top box (STB) or any machine capable of executing a sequence of instructions that specify actions to be taken by that machine.

The computer system 1000 includes a processor 1002, a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020 to interface the computer system to a network 1022.

The disk drive unit 1016 includes a machine-readable medium 1024 on which is stored a set of instructions or software 1026 embodying any one, or all, of the methodologies described herein. The software 1026 is also shown to reside, completely or at least partially, within the main memory 1004 and/or within the processor 1002. The software 1026 may further be transmitted or received via the network interface device 1020.

For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals. Further, white the software is shown in FIG. 10 to reside within a single device, it will be appreciated that the software 1026 could be distributed across multiple machines or storage media, which may include the machine-readable medium.

It should also be noted that in some embodiment the methods 100, 200, and 300 may be implemented on a machine-accessible medium having instructions. The instructions when executed by a machine perform the methods 100, 200, and 300. The medium may be removable media that is interfaced to the machine. Alternatively, the medium may be fixed media that is an integral part of the machine. In this manner, the instructions of the methods 100, 200, and 300 may be pressed on removable media and uploaded to a machine, preloaded within a machine, downloaded on a machine from a peripheral device, or downloaded from a remote machine over a network to a different machine.

The above description is illustrative, and not restrictive. Many other embodiments will be apparent to those of ordinary skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

What is claimed is:

1. A method implemented in a non-transitory computer-readable storage medium, including:
   managing a first custom-defined application cache for a first application that is defined by the first application and a plurality of other first instances of the first application, via multiple first unique key definitions acquired from a first key manager, the first key manager defined by the first application;
   managing a second custom-defined application cache for a second application that is defined by the second application and a plurality of other second instances of the second application, via multiple second unique key definitions acquired from a second key manager, the second key manager defined by the second application; and
   synchronizing first portions of the first custom-defined application cache from a first memory heap with second portions of the second custom-defined application cache from a second memory heap, synchronization processed in accordance with a dynamically communicated instruction from a global administrator, the instruction received at a predefined interval.

2. A method implemented in a non-transitory computer-readable storage medium, including:
   managing a first custom-defined application cache for a first application that is defined by the first application and a plurality of other first instances of the first application, via multiple first unique key definitions acquired from a first key manager, the first key manager defined by the first application;
   managing a second custom-defined application cache for a second application that is defined by the second application and a plurality of other second instances of the second application, via multiple second unique key definitions acquired from a second key manager second key manager defined by the second application; and
   synchronizing first portions of the first custom-defined application cache from a first memory heap with second portions of the second custom-defined application cache from a second memory heap, synchronization processed in accordance with a dynamically communicated instruction from a global administrator, the instruction received at a dynamically instructed interval.

* * * * *

UNITED STATES PATENT AND TRADEMARK OFFICE
CERTIFICATE OF CORRECTION

PATENT NO. : 8,301,590 B2
APPLICATION NO. : 13/026909
DATED : October 30, 2012
INVENTOR(S) : Kasten et al.

Page 1 of 2

It is certified that error appears in the above-identified patent and that said Letters Patent is hereby corrected as shown below:

On Title page 2, Item (56), in column 2, under "Other Publications", line 51, delete "P," and insert --P.,--, therefor On Title page 3, Item (56), in column 1, under "Other Publications", line 15, delete "Nov. 29, 2011" and insert --Dec. 29, 2011--, therefor On Title page 3, Item (56), in column 1, under "Other Publications", line 16, delete "Sep. 29, 2011" and insert --Jun. 29, 2011--, therefor On Title page 3, Item (56), in column 1, under "Other Publications", line 49, delete "Jul. 24, 2007" and insert --Apr. 24, 2007--, therefor On Title page 3, Item (56), in column 1, under "Other Publications", line 61, delete "11/965,458" and insert --11/965,458,--, therefor In column 1, line 5, after "application is", insert --co-pending--, therefor In column 1, line 29, before "a", insert --of--, therefor In column 1, line 34, after "globally", insert --in--, therefor In column 4, line 32, delete "custom-caching," and insert --custom-caching--, therefor In column 5, line 21, after "that", delete "the", therefor In column 8, line 12, delete "took" and insert --look--, therefor In column 8, line 61, delete "FIG." and insert --FIG. 2.--, therefor Signed and Sealed this
Twelfth Day of March, 2013

Teresa Stanek Rea
*Acting Director of the United States Patent and Trademark Office*

CERTIFICATE OF CORRECTION (continued)
U.S. Pat. No. 8,301,590 B2

In column 9, line 28, before "the", insert --that--, therefor

In column 9, line 55, after "references", insert --of--, therefor

In column 10, line 49, delete "fail" and insert --fall--, therefor

In column 10, line 64, delete "and", and insert --are--, therefor

In column 12, line 41, delete "white" and insert --while--, therefor

In column 13, line 51, before "some", delete "the", therefor

In column 13, line 57, delete "where" and insert --were--, therefor

In column 14, line 55, delete "in" and insert --In--, therefor

In column 15, line 26, after "or", insert --the--, therefor

In column 15, line 35, delete "728" and insert --628--, therefor

In column 15, line 52, delete "840" and insert --740--, therefor

In column 16, line 56, before "cellular", insert --a--, therefor

In column 17, line 20, delete "white" and insert --while--, therefor

In column 18, line 41, in claim 2, delete "manager" and insert --manager, the--, therefor